United States Patent
Onweller et al.

(10) Patent No.: US 6,510,203 B1
(45) Date of Patent: Jan. 21, 2003

(54) CENTRAL OFFICE TECHNICIAN NOTIFICATION AND INFORMATION SYSTEM

(75) Inventors: Arthur E. Onweller, Evergreen, CO (US); Paul J. Meyer, Erie, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/421,487

(22) Filed: Oct. 20, 1999

(51) Int. Cl.[7] .............................................. H04M 1/24
(52) U.S. Cl. ...................... 379/9; 379/9.02; 379/9.03; 379/9.04; 379/14.01
(58) Field of Search .................... 379/1.01, 9, 9.01, 379/9.03, 9.02, 14.01, 10.01, 15.01, 21, 22.03, 22.04, 24, 25, 26.01, 27.01, 29.01, 29.08, 29.09, 29.1, 29.11, 32.01; 455/423, 424, 426, 67.1; 370/241, 242, 244, 245

(56) References Cited

U.S. PATENT DOCUMENTS

| | | | | |
|---|---|---|---|---|
| 5,016,269 A | * | 5/1991 | Rogers | 379/40 |
| 5,357,557 A | * | 10/1994 | Sakakura | 379/27 |
| 5,425,076 A | * | 6/1995 | Knippelmier | 379/27 |
| 5,592,540 A | * | 1/1997 | Beveridge | 379/184 |
| 5,615,246 A | * | 3/1997 | Beveridge | 379/93.08 |
| 5,703,929 A | * | 12/1997 | Schillaci et al. | 379/21 |
| 5,710,648 A | * | 1/1998 | Frigo | 379/39 |
| 5,764,726 A | * | 6/1998 | Selig et al. | 379/21 |
| 5,764,756 A | | 6/1998 | Onweller | |
| 5,799,016 A | | 8/1998 | Onweller | |
| 5,835,564 A | * | 11/1998 | Chang et al. | 455/67.1 |
| 5,870,667 A | * | 2/1999 | Globushutz | 379/1 |
| 5,903,731 A | * | 5/1999 | Vincent et al. | 395/200.56 |
| 5,907,610 A | | 5/1999 | Onweller | |
| 5,917,900 A | * | 6/1999 | Allison et al. | 379/220 |
| 6,026,145 A | * | 2/2000 | Bauer et al. | 379/26 |
| 6,055,243 A | * | 4/2000 | Vincent et al. | 370/466 |
| 6,061,430 A | * | 5/2000 | Miller et al. | 379/40 |
| 6,061,450 A | * | 5/2000 | Ratcliff et al. | 379/15 |
| 6,078,964 A | * | 6/2000 | Ratcliff et al. | 709/300 |
| 6,240,337 B1 | * | 5/2001 | Marr, Jr. et al. | 700/286 |
| 6,285,680 B1 | * | 9/2001 | Steinka et al. | 370/431 |
| 6,314,163 B1 | * | 11/2001 | Acampora | 455/449 |
| 6,377,782 B1 | * | 4/2002 | Bishop et al. | 455/3.01 |

* cited by examiner

*Primary Examiner*—Rexford Barnie
(74) *Attorney, Agent, or Firm*—Townsend and Townsend and Crew LLP

(57) ABSTRACT

A method and system for use in a central office (CO) having network elements for communicating information between a central office technician (COT) stationed within the CO and network element monitoring personnel or monitoring center stationed remote from the CO. A local area network (LAN) having a hub stationed remote from the CO and a fiber communication line connected to the hub is provided. The fiber communication line has one end extending to the hub and the other end extending within the central office. The hub is operable for communicating with network element monitoring personnel stationed remote from the CO. A node transceiver is coupled to the other end of the fiber communication line within the central office. A wireless transceiver is operable with the node transceiver for providing a communication link between a COT stationed within the CO and the network element monitoring personnel stationed remote from the CO via the local area network. An Internet protocol communication link connects the hub of the local area network with the network element monitoring personnel. An alarm circuit connects the network element monitoring personnel with the network elements. The network element monitoring personnel monitor the status of the network elements using the alarm circuit.

27 Claims, 6 Drawing Sheets

CENTRAL OFFICE TECHNICIAN NOTIFICATION AND INFORMATION SYSTEM

TECHNICAL FIELD

The present invention relates generally to a communication networking system for monitoring telephony central offices and, more particularly, to a method and system for communicating information between a central office technician (COT) stationed within the central office and network element monitoring personnel stationed remote from the central office.

BACKGROUND ART

A central office (CO) is a telephone company building where subscribers' lines are joined to switching equipment for connecting other subscribers to each other, locally and long distance. A CO generally includes telecommunication equipment such as switches, transformers, fibers, and cables, and the like, and other equipment such as cable distribution frames, batteries, air conditioning, heating systems, and the like. The equipment of a CO is generally referred to as network element equipment or network elements. Monitoring personnel monitor the network elements of a CO to ensure everything is working properly. In the event network elements have problems, central office technicians (COTs) work on the network elements to fix the problems.

In the past, COTs working within the CO monitored the network elements. The network elements were each configured with an alerting device. The alerting devices alerted the COTs if the network elements failed or malfunctioned. The alerting devices employed audio and visual means to alert the COTs within the CO that there was a problem. For instance, bells or red flashing lights alerted COTs of network element equipment problems. Upon being alerted, the COTs further investigated the network elements to locate the problem area and determine the particular problem.

As newer network elements were installed in the COs, the monitoring and alarming functionality was integrated into communication interfaces on the network elements. The communication interface allowed the monitoring and alarming functionality to be remote to other locations within the CO. The newer monitoring and alarming functionality replaced the previous simple on/off audio and visual alarms to provide status of the network elements before the network elements actually failed. Connectivity to the monitoring equipment allowed analysis of monitoring and alarm conditions to monitoring personnel. This allowed COTs to perform other tasks within the CO while waiting for network elements to malfunction. Gradually, the presence of on/off audio and visual alarms within the CO was retired. Meanwhile, further computer applications were implemented to increase the capability of monitoring and alarming systems to the point where remote operation of the network elements within the CO without local human intervention was possible. A monitoring center remote from the CO housed the monitoring and alarming systems. Monitoring personnel within the monitoring center monitored the status of the network elements.

Because there were no communication standards regarding the transport of monitoring and alarm data conditions between the remote monitoring center and the network elements, a number of different communication protocols were used to transport the data conditions. Asynchronous as well as synchronous data communication protocols were used. The remote monitoring center was responsible for providing the appropriate communication interfaces as well as support the specific communication protocols to receive monitoring and alarm data messages from the network elements. COTs reviewed the messages and took appropriate action to correct network element equipment malfunctions.

Current technology using Transmission Control Protocol/Internet Protocol (TCP/IP) provides network connectivity between the monitoring center and the administrative area of the CO. While the remote monitoring centers work well, the problem of notifying a COT of a problem that cannot be resolved remotely is an issue.

The current methodology is for monitoring personnel within the monitoring center to issue an electronic trouble ticket for the network elements in an alarm state. The monitoring personnel issue electronic trouble tickets using a trouble ticket host. The trouble ticket host uses standard communication technology to electrically transmit trouble tickets and work orders to an administrative area of the CO. In the administrative area, the trouble tickets are printed on four part paper. One copy is given to a COT to resolve the problem. The COT then walks over to the area of the CO containing the network element equipment and works on the troubled equipment to correct the problem. After the COT has cleared the trouble, the COT leaves the area of the CO housing the network element equipment and returns to the administrative area. The COT then inputs the trouble ticket data and the reason for the outage into a computer for electronic transmission back to the trouble ticket host.

The trouble ticket host then notifies the monitoring center personnel that the problem network element equipment has been fixed. The network element equipment may also automatically notify the monitoring center via an electronic message that the problem has been fixed and that the status has returned to normal operating condition.

Periodically, the printed trouble tickets are picked up and distributed to the appropriate COT for action. This practice is time consuming and may result in significant delay in notifying the COT that there is a network element equipment problem and in getting resources to resolve the problem. After the COT clears the problem the COT notifies the administrative area that the problem and the trouble ticket has been cleared. There may be significant time lapse between the time the trouble was actually cleared and the time the COT inputs the cleared trouble ticket status. This practice results in delays in delivery of trouble tickets to the CO, delays in reaching the COT, and delays in reporting the resolution of the clearing of the trouble. In some cases, these times must be reported to determine an efficiency report card on CO operations.

Normal means of communication and notification are unusually difficult in a CO. The responsibility of a COT requires serving a variety of network element equipment in the CO. Normally, the CO physical plant is a multi-story building. Generally, the larger the CO, the more stories it contains. Further, COs are constructed of high strength materials and are heavily reinforced. The use of electronic pagers is not reliable because of the high density of network element equipment and the electromagnetic interference around the equipment. Cell telephony can not be used as the frequency range of the cell phone interferes with network element equipment.

What is needed is a method and system for communicating information between a COT stationed within the CO and network element monitoring personnel stationed remote from the CO or a network monitoring center stationed remote from the CO.

SUMMARY OF THE INVENTION

Accordingly, it is an object of the present invention to provide a method and system employing a wireless local area network (LAN) for communicating information between a COT stationed within the CO and network element monitoring personnel stationed remote from the CO.

It is another object of the present invention to provide a method and system employing a LAN having a hub stationed remote from the CO and a fiber communication line extending from the hub into the CO for enabling communication between a COT stationed within the CO and network element monitoring personnel stationed in the administrative area of the CO and monitoring applications on OSS hosts located in remote data centers.

It is a further object of the present invention to provide a method and system in which a COT stationed within the CO uses a wireless transceiver to communicate with a node transceiver connected to a hub of a LAN for communicating with network element monitoring personnel stationed remote from the CO.

In carrying out the above objects and other objects, the present invention provides a system for use in a central office (CO) having network elements. The system is for communicating information between a central office technician (COT) stationed within the CO and network element monitoring personnel stationed remote from the CO over a private Internet Protocol (IP) network. The system includes a local area network (LAN) having a hub and a fiber communication line connected to the hub. The hub is stationed remote from the CO. The fiber communication line has one end extending to the hub and the other end extending within the central office. The hub is operable for communicating with network element monitoring personnel stationed remote from the CO. A node transceiver is coupled to the other end of the fiber communication line within the central office. A wireless transceiver is operable with the node transceiver for providing a communication link between a COT stationed within the CO and the network element monitoring personnel stationed remote from the CO via the local area network.

Preferably, the network element monitoring personnel transmit network element alarm information to the COT stationed within the CO via the private IP network, the local area network, the node transceiver, and the wireless transceiver. The COT stationed within the CO transmits network element status information to the network element monitoring personnel stationed remote from the CO via the wireless transceiver, the node transceiver, the local area network, and the private IP network. The network element alarm information and the network element status information may be data and voice information.

Preferably, an Internet protocol communication link connects the hub of the local area network with the network element monitoring personnel. An alarm circuit connects the network element monitoring personnel with the network elements. The network element monitoring personnel monitor the status of the network elements using the alarm circuit. Preferably, the wireless transceiver is a held hand device or a computer carried by the COT stationed within the CO.

Preferably, the local area network includes a server connected to the hub. The server is operable for receiving alarm information from the network element monitoring personnel and for receiving network element status information from the COT stationed within the CO.

Further, in carrying out the above objects and other objects, the present invention provides a method for use in a central office (CO) having network elements. The method is for communicating information between a central office technician (COT) stationed within the CO and network element monitoring personnel stationed remote from the CO. The method includes providing a local area network (LAN) having a hub and a fiber communication line connected to the hub. The hub is stationed remote from the CO. The fiber communication line has one end extending to the hub and the other end extending within the central office. The hub is operable for communicating with network element monitoring personnel stationed remote from the CO. A node transceiver is then coupled to the other end of the fiber communication line within the central office. A wireless transceiver operable for communicating with the node transceiver is then provided. A communication link between a COT stationed within the CO and the network element monitoring personnel stationed remote from the CO is then enabled via the wireless transceiver, the node transceiver, and the local area network.

The advantages of the present invention are numerous. The present invention enables COTs to be able to receive and transmit messages to remote monitoring personnel and other COTs regardless of their location within the CO.

The above objects and other objects, features, and advantages of the present invention will be apparent from the following detailed description of the best mode for carrying out the invention when taken in connection with the accompanying drawings.

BEST MODE FOR CARRYING OUT THE INVENTION

Figure 1:
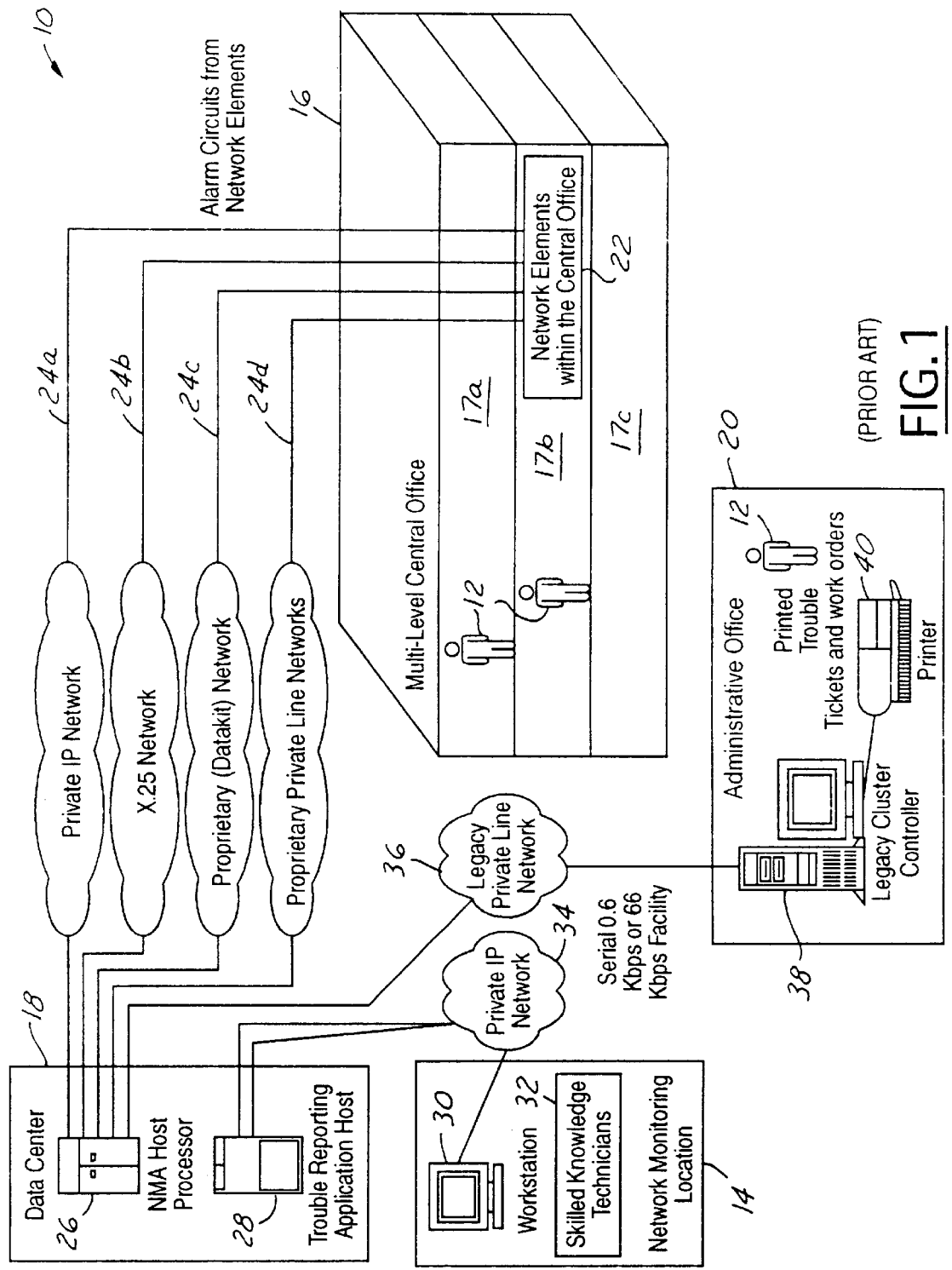
FIG. 1 illustrates a prior art system for communicating information between a central office technician (COT) and network element monitoring personnel.

Referring now to FIG. 1, a prior art system 10 for communicating information between a central office technician (COT) 12 and a network element monitoring center 14 is shown. System 10 includes a central office (CO) 16, a data center 18, monitoring center 14, and an administrative office 20. CO 16 is a multi-story building having a plurality of floors 17a, 17b, and 17c with network elements 22. Network elements or network element equipment 22 are processor controlled entities of the telecommunications network that primarily provide switching and transport network functions and contain network operations functions. Examples include non-AIN and AIN switching systems, digital cross-connect systems, and Signaling Transfer Points. In SONET, basic network elements include add/drop multiplexer, broadband digital cross-connect, wideband digital cross-connect, digital loop carrier, and switch interface. Network elements 22 generate strong electro-magnetic fields making it difficult for COTs to communicate with the outside world using pagers and cell phones. CO 16 is a heavily reinforced building making pager and cell phone communication further difficult.

Monitoring center 14, data center 18, and administrative office 20 are operations support systems (OSSs) which directly support the daily operations of the telecommunications infrastructure. At least one of a plurality of alarm circuits 24a, 24b, 24c, and 24d connect data center 18 to network elements 22. Alarm circuits 24a, 24b, 24c, and 24d have monitoring devices integrated with network elements 22 for generating data signals indicative of the status of the network elements. Data center 18 receives the data signals from alarm circuits 24a, 24b, 24c, and 24d for generating information regarding the status of network elements 22. Data center 18 is stationed remote from CO 16 and receives the data signals from alarm circuits 24a, 24b, 24c, and 24d over respective communication links. The respective communication links are a private Internet Protocol (IP) network, an X.25 network, a proprietary network, and a proprietary private line network.

Data center 18 includes a network management host processor 26 which is connected to the respective communication links for receiving the data signals from alarm circuits 24a, 24b, 24c, and 24d. Data center 18 further includes a trouble reporting application host 28.

Monitoring center 14 is also stationed remote from CO 16. Monitoring center 14 and data center 18 may be connected to multiple central offices across a region and by necessity are stationed remote from at least one of the central offices. Monitoring center 14 includes at least one workstation 30 and network element monitoring personnel 32. A private IP network 34 connects monitoring center 14 to data center 18. Private IP network 34 connects workstation 34 to host processor 26 for receiving the data signals from alarm circuits 24a, 24b, 24c, and 24d. Monitoring personnel 32 use workstation 30 to monitor the data signals from alarm circuits 24a, 24b, 24c, and 24d to determine the status of network elements 22. Monitoring personnel 32 study the data signals to determine if network elements 22 have a current problem or will likely to have a problem in the future. In response to a network element condition that needs to be fixed or remedied, monitoring personnel 32 transmit a trouble ticket signal over IP network 34 to trouble reporting application host 28 of data center 18.

In response to the trouble ticket signal, trouble reporting application host 28 generate an electronic trouble ticket. The trouble ticket is indicative of the network element having a problem and may also indicate the problem itself. Trouble reporting application host 28 then transmits the electronic trouble ticket over a legacy private line network 36 to administrative office 20. Administrative office 20 is located in CO 16 but is positioned remote from the area of CO containing network elements 22. Administrative office 20 includes a workstation 38 and a printer 40. Workstation 38 receives the printed trouble ticket from trouble reporting application host 28 and then uses printer 40 to generate a hard copy of the trouble ticket. A COT 12 waiting within administrative office 20 picks up the trouble ticket and then walks over to the area of CO 16 containing network elements 22 to fix the network element having the problem. Upon clearing the problem COT 12 moves out of the area of CO 16 containing network elements 22 and returns to administrative office 20. COT 12 then uses workstation 38 to report to monitoring center 14 via trouble reporting application host 28 that the problem has been cleared.

Figure 2:
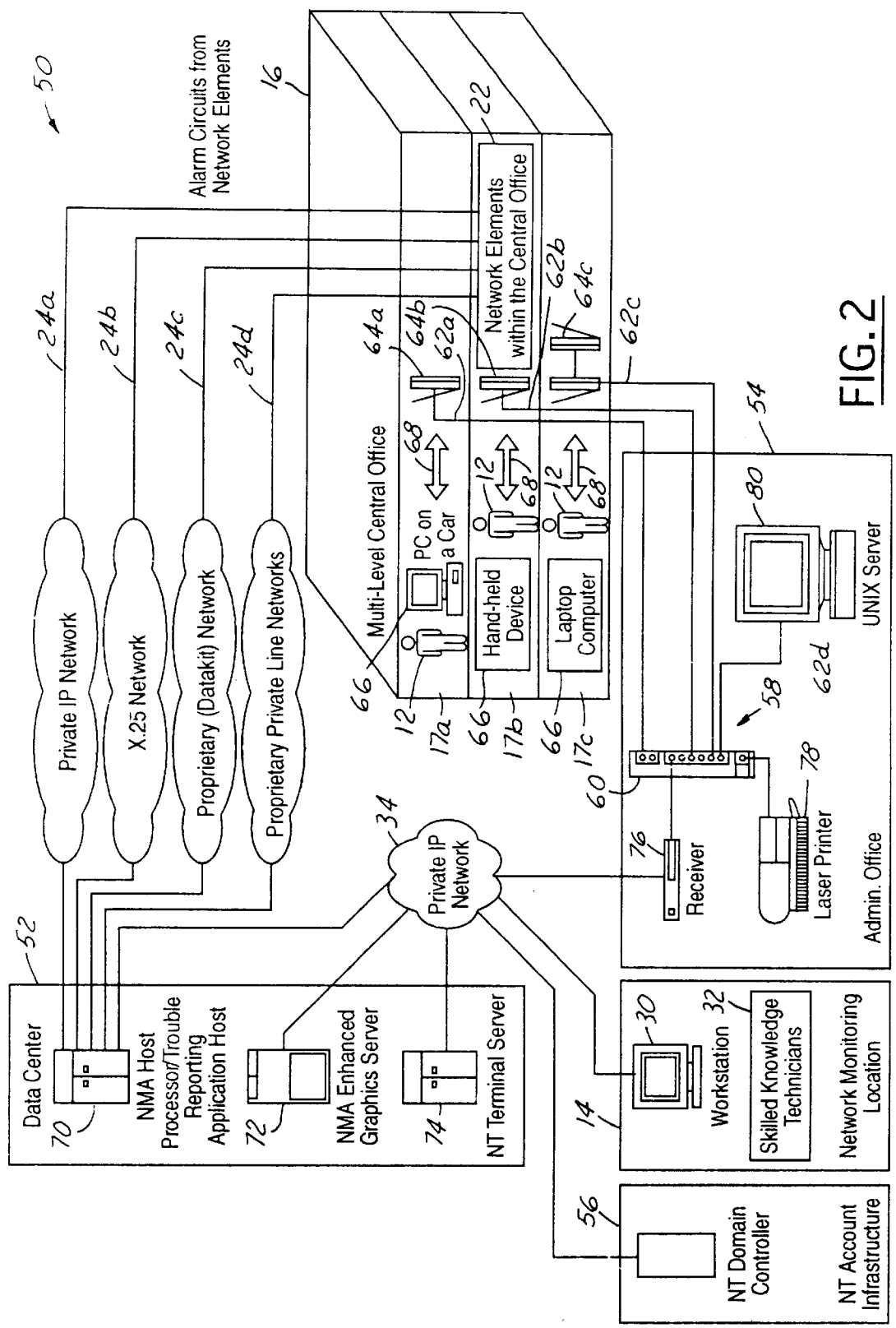
FIG. 2 illustrates a system for communicating information between a central office technician (COT) stationed within the central office and network element monitoring personnel stationed remote from the central office in accordance with the present invention.

Referring now to FIG. 2, a system 50 for communicating information between COT 12 stationed within CO 16 and network element monitoring center stationed remote from the CO in accordance with the present invention is shown. System 50 includes common elements with system 10 and the common elements have the same reference numbers. System 50 generally includes CO 16, monitoring center 14, a data center 52, an administrative office 54, and user account infrastructure 56.

Administrative office 54 is stationed remote from the area of CO 16 containing network elements 22. Administrative office 54 includes a local area network (LAN) 58. LAN 58 includes a hub 60 and a plurality of fiber communication lines 62a, 62b, 62c, and 62d. Preferably, communication lines 62a, 62b, 62c, and 62d are fiber communication lines to allow long runs (up to 2000 km) and to shield electrical interference. Fiber communication lines 62a, 62b, and 62c extend from hub 60 in administrative office 54 to within CO 16 adjacent network elements 22. Each fiber communication line 62a, 62b, and 62c is positioned on respective floors 17a, 17b, and 17c within CO 16. Node transceivers 64a, 64b, and 64c are coupled to respective fiber communication lines 62a, 62b, and 62c. Transceivers 64a, 64, and 64c are configured for receiving signals from and transmitting signals to hub 60 via respective fiber communication lines 62a, 62b, and 62c.

COT 12 uses a wireless device 66 to communicate with UNIX server 80 of administrative area 54 and an NT terminal server 74 of data center 52 via LAN 58. Wireless device 66 is operable with node transceivers 64a, 64b, and 64c for transmitting wireless signals to and receiving wireless signals from the transceivers over a wireless communication link 68 to communicate with hub 60 of LAN 58. Wireless device 66 is a hand held device such as personal digital assistant, a lap top computer, a personal computer on a cart, and the like. As will be described in greater detail, hub 60 is operable for communicating with network element monitoring center 14 such that COT 12 is able to communicate using wireless device 66 with the monitoring center via LAN 58.

As with system 10 of FIG. 1, alarm circuits 24a, 24b, 24c, and 24d connect data center 52 to network elements 22 for the data center to receive data signals indicative of the condition of the network elements. Data center 52 includes a host processor/trouble reporting application host 70, a graphics server 72, and a terminal server 74. Host processor/trouble reporting application host 70 receives the data signals indicative of the condition of network elements 22 from alarm circuits 24a, 24b, 24c, and 24d. Host processor/trouble reporting application host 70 forwards the data signals over IP network 34 to monitoring center 14. Monitoring personnel 32 study the data signals and in the event of a problem may transmit a trouble ticket signal back to data center 52. In response to a trouble ticket signal, host processor/trouble reporting application host 70 transmits a trouble ticket over IP network 34 to a router 76 within administrative office 54. Of course, host processor/trouble reporting application host 70 may automatically study the data signals and transmit a trouble ticket signal over IP network 34 to router 76 within administration office 54. This procedure is performed automatically without the need for human monitoring personnel intervention. Router 76 is connected to hub 60 of LAN 58. A printer 78 is connected to hub 60. Printer 78 prints a printed trouble ticket for personnel within administrative office 54. Personnel within administrative office 54 may then contact COT 12 within CO using wireless LAN 58.

In response to detecting a problem, monitoring personnel 32 may also establish a direct data or voice communication connection with LAN 58 via IP network 34 for communicating directly with COT 12. The communication connection extends from workstation 30 of monitoring center 14 through IP network 34, router 76, hub 60, fiber communication links 62a, node transceiver 64a to wireless transceiver 66 carried by COT 12. COT 12 may then receive the data or voice signals to become aware of the problem, go over to network elements 22 and fix the problem, and then transmit data or voice signals back to monitoring center 24 to indicate that the problem has been fixed, what the problem is, how should the COT fix the problem, and the like. In essence, COT 12 can communicate with monitoring center 14 similarly to the communication that takes place over a pager or cell phone without actually using these devices.

Thus, the general operation of system 10 is as follows. Network elements 22 within CO 16 have a problem. Alarm circuits 24a, 24b, 24c, and 24d convey data signals indicative of the status of network elements 22 to data center 52. Data center 52 forwards the data signals to monitoring center 14. Monitoring center 14 studies the data signals and determines that an alarm condition exists. Monitoring center then either directly or indirectly contacts COT 12 stationed within CO 16 by using LAN 60 in conjunction with wireless transceiver 66 carried by the COT. COT 12 then fixes the problem and may communicate with monitoring center 14 while fixing the problem.

Administrative office 54 further includes a UNIX server 80. Fiber communication link 62d connects UNIX server 80 to hub 60. UNIX server 80 is used for establishing the desired communication paths between COTs 12 and monitoring center 14 and is also the print server. UNIX server 80 is operable for receiving alarm information from monitoring center 14 and for receiving network element status information from COT 12 within CO 16.

Each wireless transceiver 66 has a dynamically assigned IP address. UNIX server 80 assigns the IP addresses. LAN 58 uses the assigned address to set up the communication path between COT 12 and monitoring center 14 or administrative office 54. Wireless transceiver 66 has dynamic host control protocol (DHCP) functionality for automatic address assignment. Wireless transceiver 66 includes a personal computer memory card international association (PCMCIA) communication card for enabling the communication link with hub 60 of LAN 58. Preferably, the communication link between COT 12 and hub 69 of LAN 58 is a Transmission Control Protocol/Internet protocol (TCP/IP) communication link. Wireless transceiver 66 preferably includes audio means for alerting COT 12 as to when somebody is attempting to establish a communication path with the COT. For instance, the audio means may be similar to a telephone ring.

Each wireless transceiver 66 must have an IP address to be used. Wireless transceiver 66 dynamically obtains an IP address by sending a special message to UNIX server 80 (DHCP server) to request an IP address as the wireless transceiver powers on. NT terminal server 74 sends a special message containing the assigned IP address to wireless transceiver 66.

The above described procedure is performed when wireless transceiver 66 powers on and before COT 12 longs on using the wireless transceiver. In logging on, COT 12 enters a logon ID and password into wireless transceiver 66. UNIX server 80 authenticates COT 12 and records the name of the COT using wireless transceiver 66 in the DHCP file. Thus, a record of the IP address of wireless device 66 and the name of COT 12 using that wireless device is kept.

In response to an alarm being received from a network element, the name of COT 12 authorized and trained to repair or maintain that network element is obtained. Then the name of the selected COT 12 is associated with the IP address of the wireless device 66 in the possession of the COT. Having the IP address of wireless device 66, UNIX server 80 can then forward the alarm to the wireless device 66 of the selected COT 12.

Figure 3:
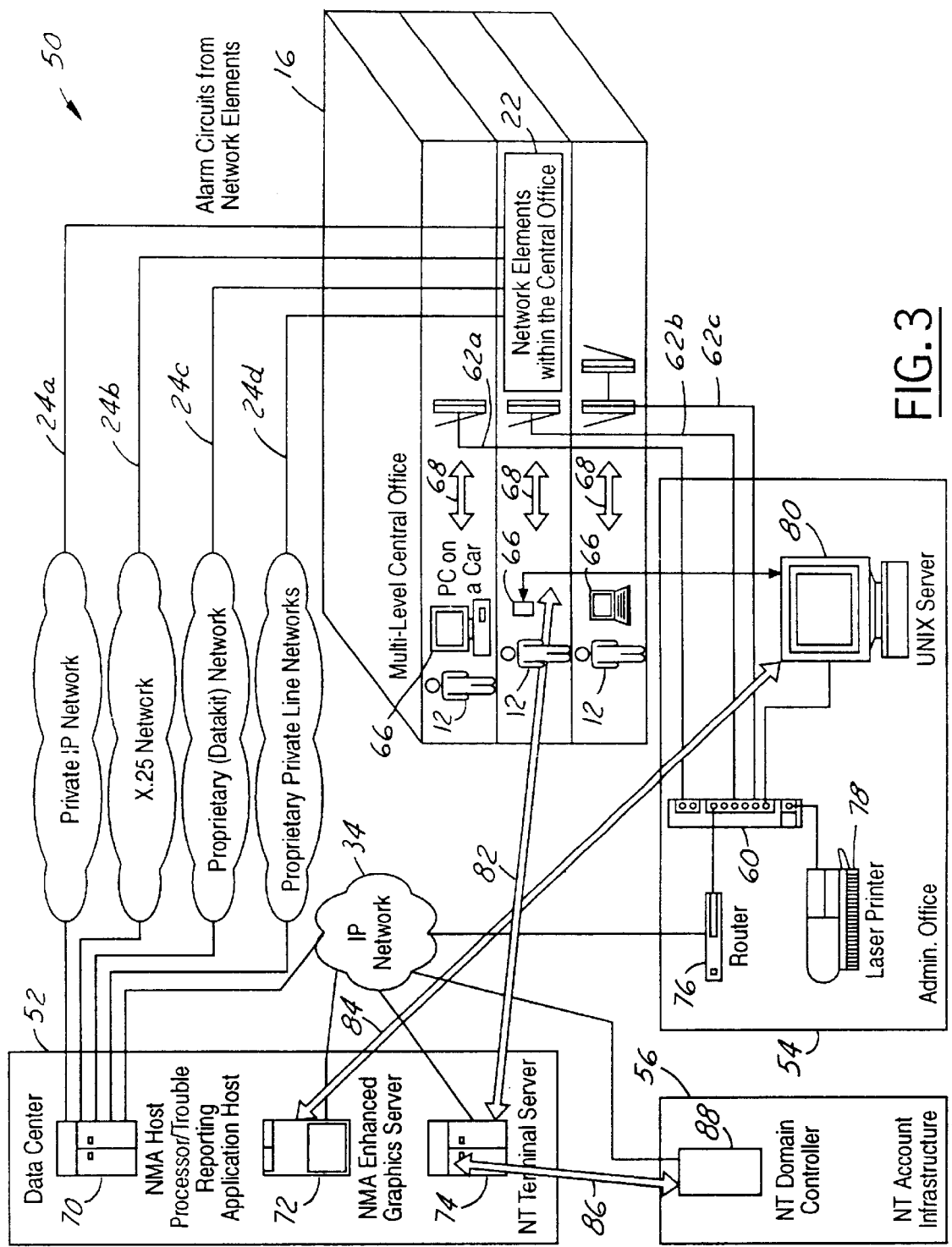
FIG. 3 illustrates system initialization communication paths.

Referring now to FIG. 3, initialization communication paths of system 50 are shown. System 50 includes an initialization communication path 82 between NT terminal server 74 and wireless transceiver 66, an initialization communication path 84 between graphics server 72 and UNIX server 80, and an initialization communication path 86 between the NT terminal server and a domain controller 88 of account infrastructure 56.

Figure 4:
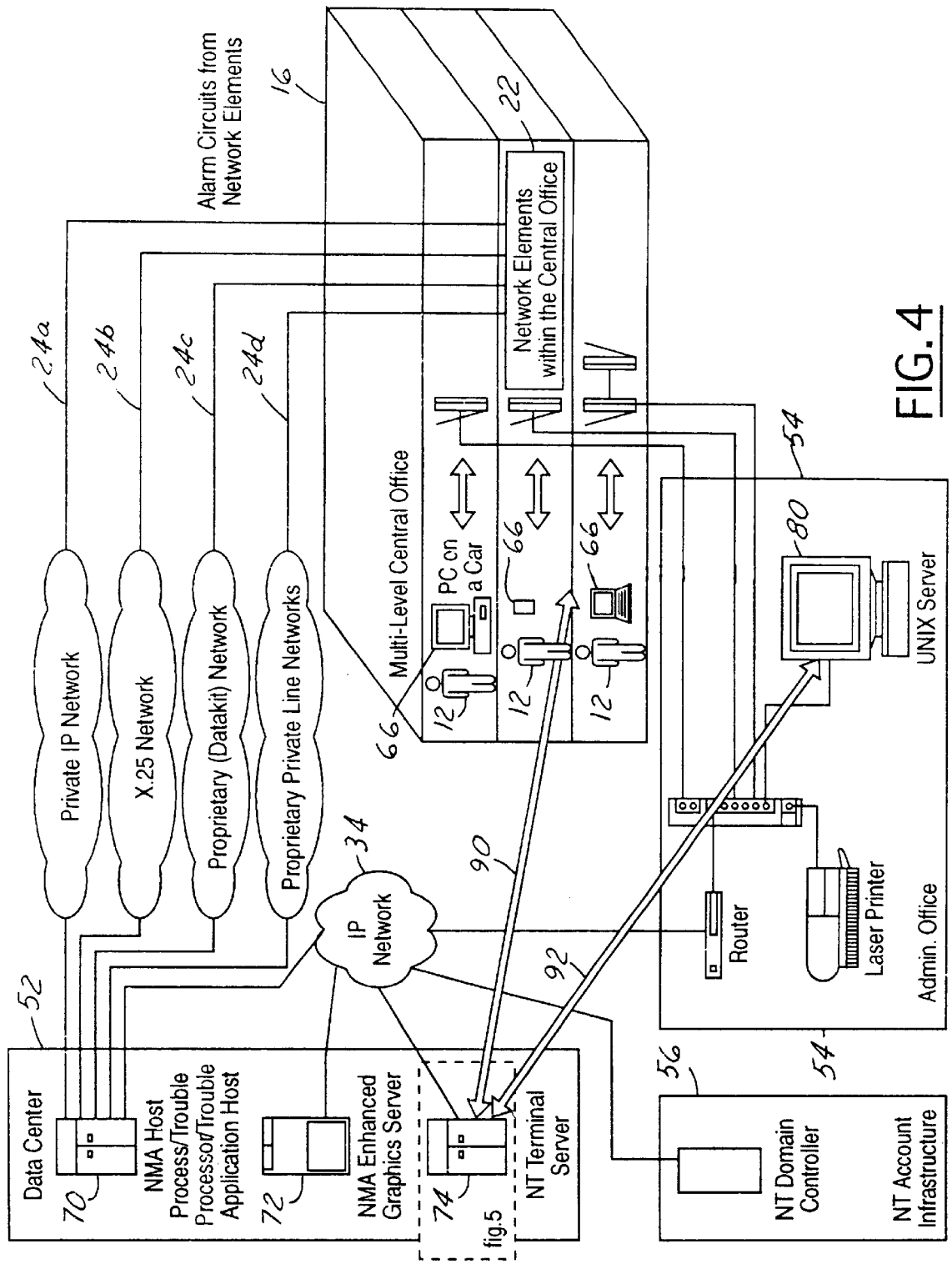
FIG. 4 illustrates system device enabler communication paths.

Referring now to FIG. 4, device enabler communication paths of system 50 are shown. System 50 includes a device enabler communication path 90 between terminal server 74 and wireless transceiver 66 and a device enabler communication path 92 between the terminal server and UNIX server 80.

Figure 5:
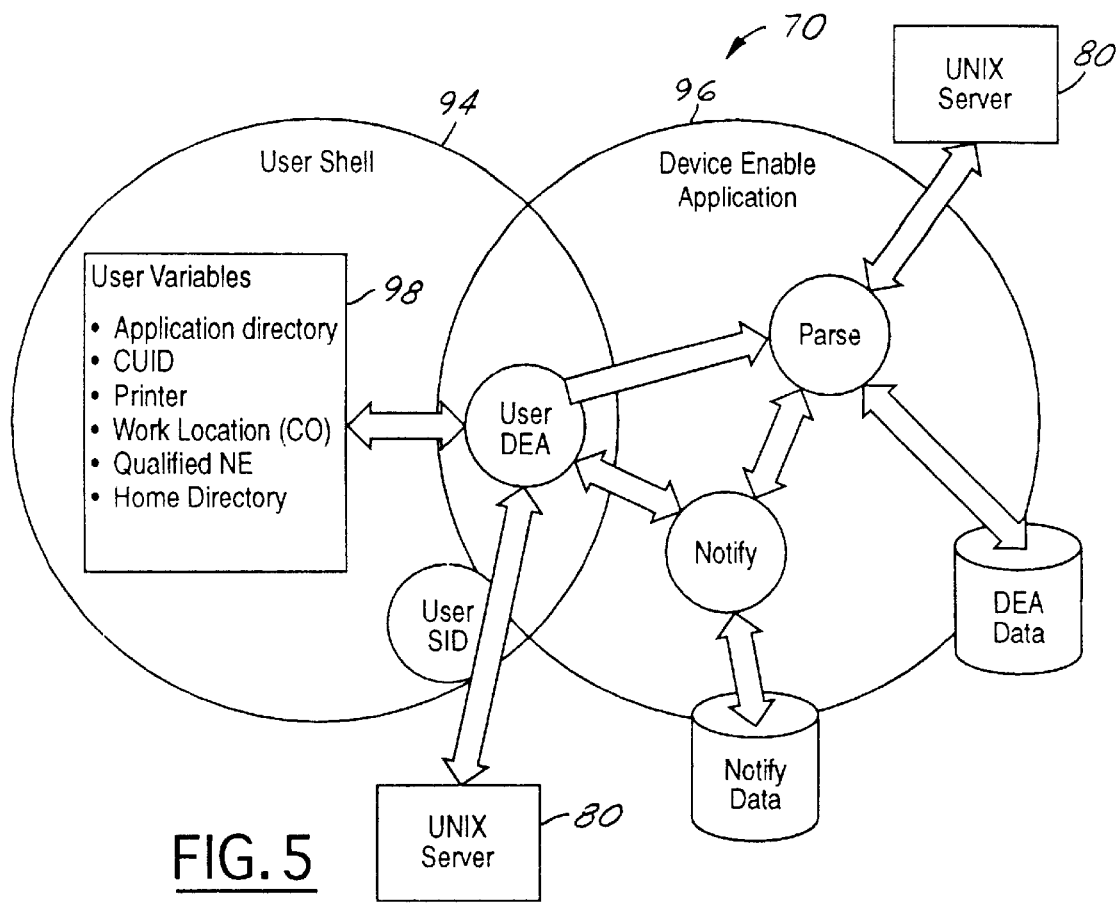
FIG. 5 illustrates the NT terminal server of the operations support system (OSS) data center.

Referring now to FIG. 5, terminal server 74 will be explained in greater detail. NT terminal server 74 includes a user shell 94 and a device enabler application 96. User shell 94 includes a list 98 of user variables. User shell 94 and device enabler application 96 communicate data with UNIX server 80 along various paths shown in FIG. 5.

Figure 7:
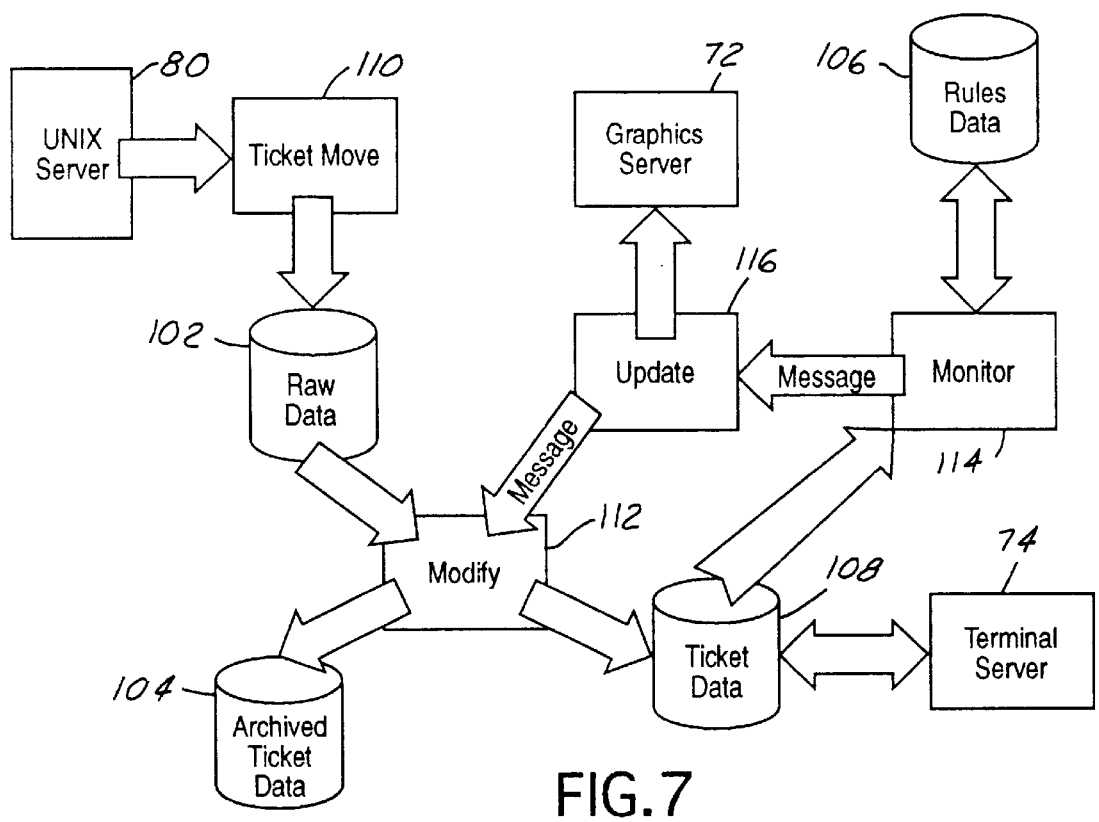
FIG. 7 illustrates UNIX server application data flow.
Figure 6:
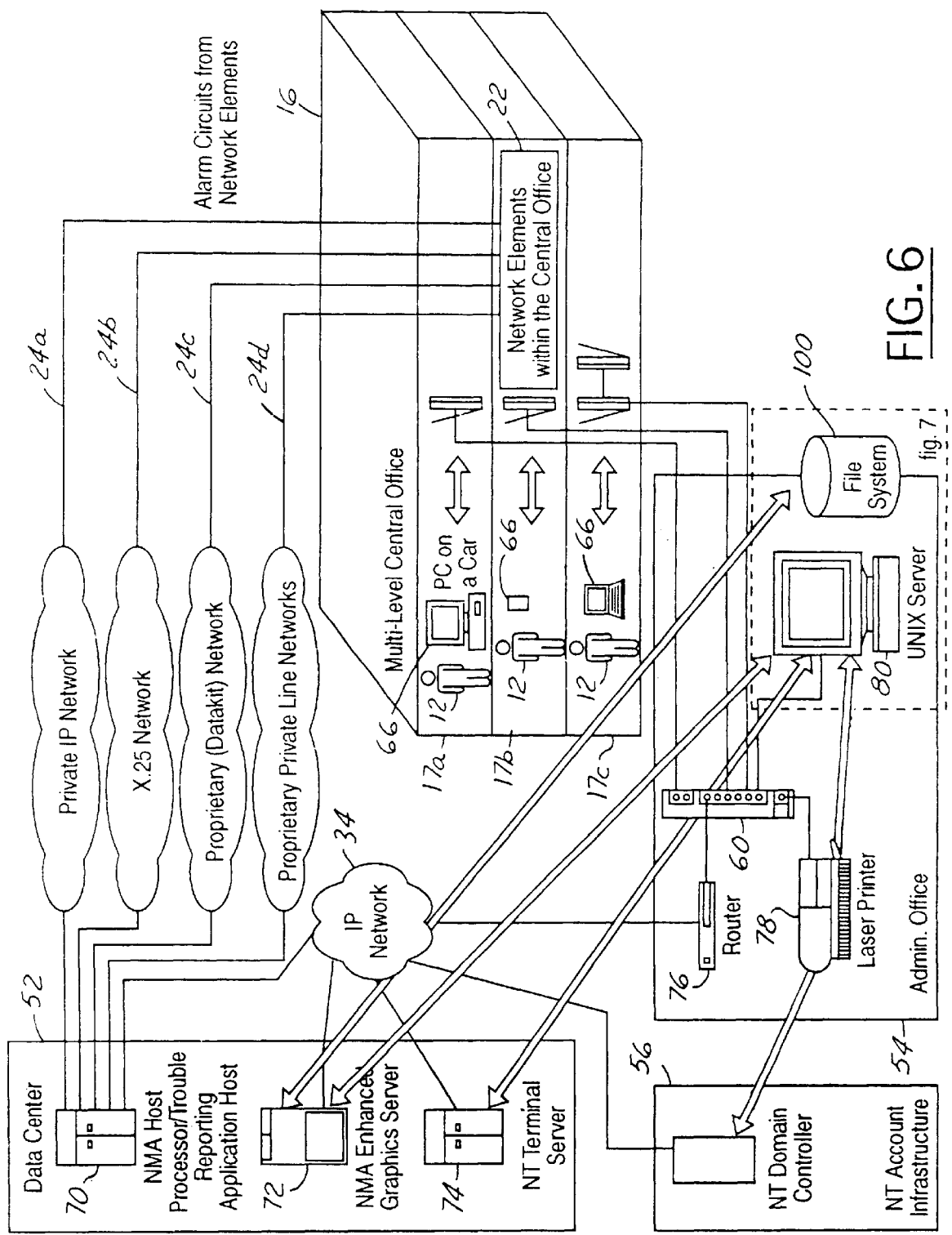
FIG. 6 illustrates system UNIX server application communication paths.

Referring now to FIGS. 6 and 7, the operation of UNIX server 80 will be described in greater detail. UNIX server 80 is operable with a file system 100 for processing trouble tickets. File system 100 includes a raw data store 102, an archived ticket data store 104, a rules data store 106, and a ticket data store 108. Raw data store 102 is operable for receiving tickets from UNIX server 80 during a ticket move operation 110. A modify operation 112 then modifies the tickets. Archived ticket data store 104 and/or ticket data store 108 may then receive the modified tickets. Terminal server 74 may then access ticket data store 108 to receive the modified tickets. A monitor operation 114 may also monitor the modified tickets of ticket data store 108 to determine if rules from rules data store 106 have been satisfied. An update operation 116 may receive a message from monitor operation 114 for graphics server 74. Update operation 116 may also send a message to modify operation 112 if the monitor operation determines that the rules have not been satisfied.

Thus, it is apparent that there has been provided, in accordance with the present invention, a method and system for communicating information between a central office technician (COT) stationed within the CO and network element monitoring personnel stationed remote from the CO that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. For use in a central office (CO) having network elements, a system for communicating information between a central office technician (COT) stationed within the CO and a network element monitoring center stationed remote from the CO, the system comprising:

a local area network (LAN) having a hub and a fiber communication line connected to the hub, the hub stationed remote from the CO, the fiber communication line having one end extending to the hub and the other end extending within the central office, the hub operable for communicating with the network element monitoring center stationed remote from the CO;

a node transceiver coupled to the other end of the fiber communication line within the central office; and a wireless transceiver operable with the node transceiver for providing a communication link between a COT stationed within the CO and the network element monitoring center stationed remote from the CO via the local area network.

2. For use in a central office (CO) having network elements, a system for communicating information between a central office technician (COT) stationed within the CO and network element monitoring personnel stationed remote from the CO, the system comprising:

a local area network (LAN) having a hub and a fiber communication line connected to the hub, the hub stationed remote from the CO, the fiber communication line having one end extending to the hub and the other end extending within the central office, the hub operable for communicating with network element monitoring personnel stationed remote from the CO;

a node transceiver coupled to the other end of the fiber communication line within the central office; and a wireless transceiver operable with the node transceiver for providing a communication link between a COT stationed within the CO and the network element monitoring personnel stationed remote from the CO via the local area network.

3. The system of claim 2 wherein:

the network element monitoring personnel transmit network element alarm information to the COT stationed within the CO via the local area network, the node transceiver, and the wireless transceiver.

4. The system of claim 2 wherein:

the COT stationed within the CO transmits network element status information to the network element monitoring personnel stationed remote from the CO via the wireless transceiver, the node transceiver, and the local area network.

5. The system of claim 2 wherein:

the communication link between the COT stationed within the CO and the hub of the local area network is a Transmission Control Protocol/Internet protocol (TCP/IP) communication link.

6. The system of claim 2 wherein:

the communication links between the COT stationed within the CO and the network element monitoring personnel stationed remote from the CO is a data communication link.

7. The system of claim 2 wherein:

the communication link between the COT stationed within the CO and the network element monitoring personnel stationed remote from the CO is a voice communication link.

8. The system of claim 2 wherein:

the wireless transceiver has an assigned address, wherein the local area network uses the assigned address to set up the communication link between the COT stationed within the CO and the network element monitoring personnel stationed remote from the CO.

9. The system of claim 2 wherein:

the wireless transceiver has dynamic host control protocol (DHCP) functionality for automatic address assignment.

10. The system of claim 2 wherein:

the wireless transceiver includes a personal computer memory card international association (PCMCIA) communication card for enabling the communication link with the hub of the local area network.

11. The system of claim 2 wherein:

the local area network further includes a second fiber communication line connected to the hub, the second fiber communication line having one end extending to the hub and the other end extending within the central office, a second node transceiver is coupled to the other end of the fiber communication line within the central office, and a second wireless transceiver is operable with the second node transceiver for providing a communication link between a second COT stationed within the CO and the network element monitoring personnel stationed remote from the CO via the hub of the local area network.

12. The system of claim 2 wherein:

a Internet protocol communication link connects the hub of the local area network with the network element monitoring personnel.

13. The system of claim 2 wherein:

an alarm circuit connects the network element monitoring personnel with the network elements, wherein the network element monitoring personnel monitor the status of the network elements using the alarm circuit.

14. The system of claim 2 wherein:

the wireless transceiver is a held hand device carried by the COT stationed within the CO.

15. The system of claim 2 wherein:

the wireless transceiver is a computer carried by the COT stationed within the CO.

16. The system of claim 2 wherein:

the local area network includes a server connected to the hub, the server operable for receiving alarm information from the network element monitoring personnel and for receiving network element status information from the COT stationed within the CO.

17. The system of claim 16 wherein:

the server is stationed in an administrative area of the CO remote from the network elements.

18. For use in a central office (CO) having network elements, a method for communicating information between a central office technician (COT) stationed within the CO and network element monitoring personnel stationed remote from the CO, the method comprising:

providing a local area network (LAN) having a hub and a fiber communication line connected to the hub, the hub stationed remote from the CO, the fiber communication line having one end extending to the hub and the other end extending within the central office, the hub operable for communicating with network element monitoring personnel stationed remote from the CO;

coupling a node transceiver to the other end of the fiber communication line within the central office;

providing a wireless transceiver operable for communicating with the node transceiver; and enabling a communication link between a COT stationed within the CO and the network element monitoring personnel stationed remote from the CO via the wireless transceiver, the node transceiver, and the local area network.

19. The method of claim 18 further comprising:

transmitting network element alarm information from the network element monitoring personnel to the COT stationed within the CO via the hub of the local area network, the node transceiver, and the wireless transceiver.

20. The method of claim 18 further comprising:

transmitting network element status information from the COT stationed within the CO to the network element monitoring personnel stationed remote from the CO via the wireless transceiver, the node transceiver, and the local area network.

21. The method of claim 18 wherein:

enabling a communication link between a COT stationed within the CO and the network element monitoring personnel stationed remote from the CO via the wireless transceiver, the node transceiver, and the local area network includes enabling a Transmission Control Protocol/Internet Protocol (TCP/IP) communication link between the COT stationed within the CO and the hub of the local area network.

22. The method of claim 18 wherein:

enabling a communication link between a COT stationed within the CO and the network element monitoring personnel stationed remote from the CO via the wireless transceiver, the node transceiver, and the local area network includes enabling a data communication link.

23. The method of claim 18 wherein:

enabling a communication link between a COT stationed within the CO and the network element monitoring personnel stationed remote from the CO via the wireless transceiver, the node transceiver, and the local area network includes enabling a voice communication link.

24. The method of claim 18 further comprising:

providing the wireless transceiver with an assigned address; and using the assigned address to set up the communication link between the COT stationed within the CO and the network element monitoring personnel stationed remote from the CO via the wireless local area network.

25. The method of claim 18 further comprising:

connecting an Internet protocol communication link between the hub of the local area network and the network element monitoring personnel.

26. The method of claim 18 further comprising:

connecting an alarm circuit between the network element monitoring personnel and the network elements; and using the alarm circuit for the network element monitoring personnel to monitor the status of the network elements.

27. The method of claim 18 further comprising:

connecting a server to the hub of the local area network; and receiving at the server alarm information from the network element monitoring personnel; and receiving at the server network element status information from the COT stationed within the CO.

* * * * *